United States Patent
Yamano

(10) Patent No.: US 7,810,591 B2
(45) Date of Patent: Oct. 12, 2010

(54) TRAVELING DEVICE

(75) Inventor: Ikuo Yamano, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 231 days.

(21) Appl. No.: 12/081,648

(22) Filed: Apr. 18, 2008

(65) Prior Publication Data

US 2008/0257617 A1    Oct. 23, 2008

(30) Foreign Application Priority Data

Apr. 19, 2007    (JP) .............................. 2007-110719

(51) Int. Cl.
*B60K 7/00*    (2006.01)
(52) U.S. Cl. .................. 180/65.1; 180/65.6; 280/47.12
(58) Field of Classification Search ................ 180/210, 180/215, 216, 65.1, 65.6; 280/5.32, 47.12, 280/47.17, 47.2, 47.24, 47.25, 47.131, 755, 280/763.1, 764.1, 767
See application file for complete search history.

(56) References Cited

U.S. PATENT DOCUMENTS

| | | | | |
|---|---|---|---|---|
| 573,334 | A * | 12/1896 | Kulage ......................... | 180/6.2 |
| 2,465,037 | A * | 3/1949 | Ream ......................... | 280/5.32 |
| 2,689,742 | A * | 9/1954 | Gemeinhardt ............... | 280/5.32 |
| 3,580,591 | A * | 5/1971 | Coffey et al. ............... | 280/5.32 |
| 3,788,413 | A * | 1/1974 | Miller ......................... | 180/8.2 |
| 3,836,160 | A * | 9/1974 | Linsley ....................... | 280/5.32 |
| 4,154,452 | A * | 5/1979 | Newman ..................... | 280/293 |
| 5,160,153 | A * | 11/1992 | Zan ............................. | 280/43.1 |
| 5,316,328 | A * | 5/1994 | Bussinger ................. | 280/304.1 |
| 5,971,091 | A | 10/1999 | Kamen et al. | |
| 6,041,876 | A * | 3/2000 | Pulver et al. ............... | 180/65.1 |
| 6,062,328 | A * | 5/2000 | Campbell et al. .......... | 180/65.6 |
| 6,131,679 | A * | 10/2000 | Pulver et al. ............... | 180/65.1 |
| 6,302,230 | B1 * | 10/2001 | Kamen et al. ............... | 180/171 |
| 6,435,535 | B1 * | 8/2002 | Field et al. .................. | 280/204 |
| 6,530,598 | B1 * | 3/2003 | Kirby ......................... | 280/755 |
| 6,969,079 | B2 * | 11/2005 | Kamen et al. ............... | 280/204 |
| 7,021,407 | B2 * | 4/2006 | Ruschke et al. ............. | 180/11 |

(Continued)

FOREIGN PATENT DOCUMENTS

JP    2004-074814 A    3/2004

(Continued)

*Primary Examiner*—Glenn Dayoan
*Assistant Examiner*—Vaughn T Coolman
(74) *Attorney, Agent, or Firm*—Kenyon & Kenyon LLP

(57) ABSTRACT

In a traveling device according to the present invention, self-support and conveyance of the device by dragging are facilitated. Two wheels 1L, 1R are provided in parallel, and the wheels 1L, 1R are provided respectively with independent driving means (motors) 2L, 2R. The driving means 2L, 2R are connected by vehicle main bodies 3U, 3D divided into an upper side and a lower side. Further, casters 32L, 32R are provided on a rear side of the lower side vehicle main body 3D via support portions 31L, 31R. The casters 32L, 32R are rotated freely by rotary shafts 33L, 33R including a bearing or the like. Further, the casters 32L, 32R are disposed such that a tangent linking the respective outer peripheries of the casters 32L, 32R to the wheels 1L, 1R forms a predetermined angle θd relative to a road surface. The angle θd is set to be larger than a maximum tilt (departure angle) within an assumed normal traveling range of the vehicle.

2 Claims, 14 Drawing Sheets

U.S. PATENT DOCUMENTS

| | | | |
|---|---|---|---|
| 7,222,881 B1 * | 5/2007 | Zhou | 280/755 |
| 7,407,175 B2 * | 8/2008 | Kamen et al. | 280/204 |
| 7,419,182 B2 * | 9/2008 | Goertzen et al. | 280/647 |
| 7,461,715 B1 * | 12/2008 | Tsai | 180/208 |
| 7,686,110 B1 * | 3/2010 | Agarwal | 180/13 |
| 2001/0045715 A1 * | 11/2001 | Abraham et al. | 280/37 |
| 2002/0149172 A1 * | 10/2002 | Field et al. | 280/446.1 |
| 2004/0016584 A1 * | 1/2004 | Kamen et al. | 180/218 |
| 2006/0011398 A1 * | 1/2006 | Kamen et al. | 180/218 |
| 2006/0097478 A1 * | 5/2006 | Goertzen et al. | 280/304.1 |
| 2006/0260857 A1 | 11/2006 | Kakinuma et al. | |
| 2007/0222199 A1 * | 9/2007 | Schattner | 280/755 |
| 2008/0173493 A1 * | 7/2008 | Adachi | 180/218 |
| 2009/0020350 A1 * | 1/2009 | Wu | 180/208 |

FOREIGN PATENT DOCUMENTS

| | | |
|---|---|---|
| JP | 2004-217170 A | 8/2004 |
| JP | 2007-336785 A | 12/2007 |

* cited by examiner

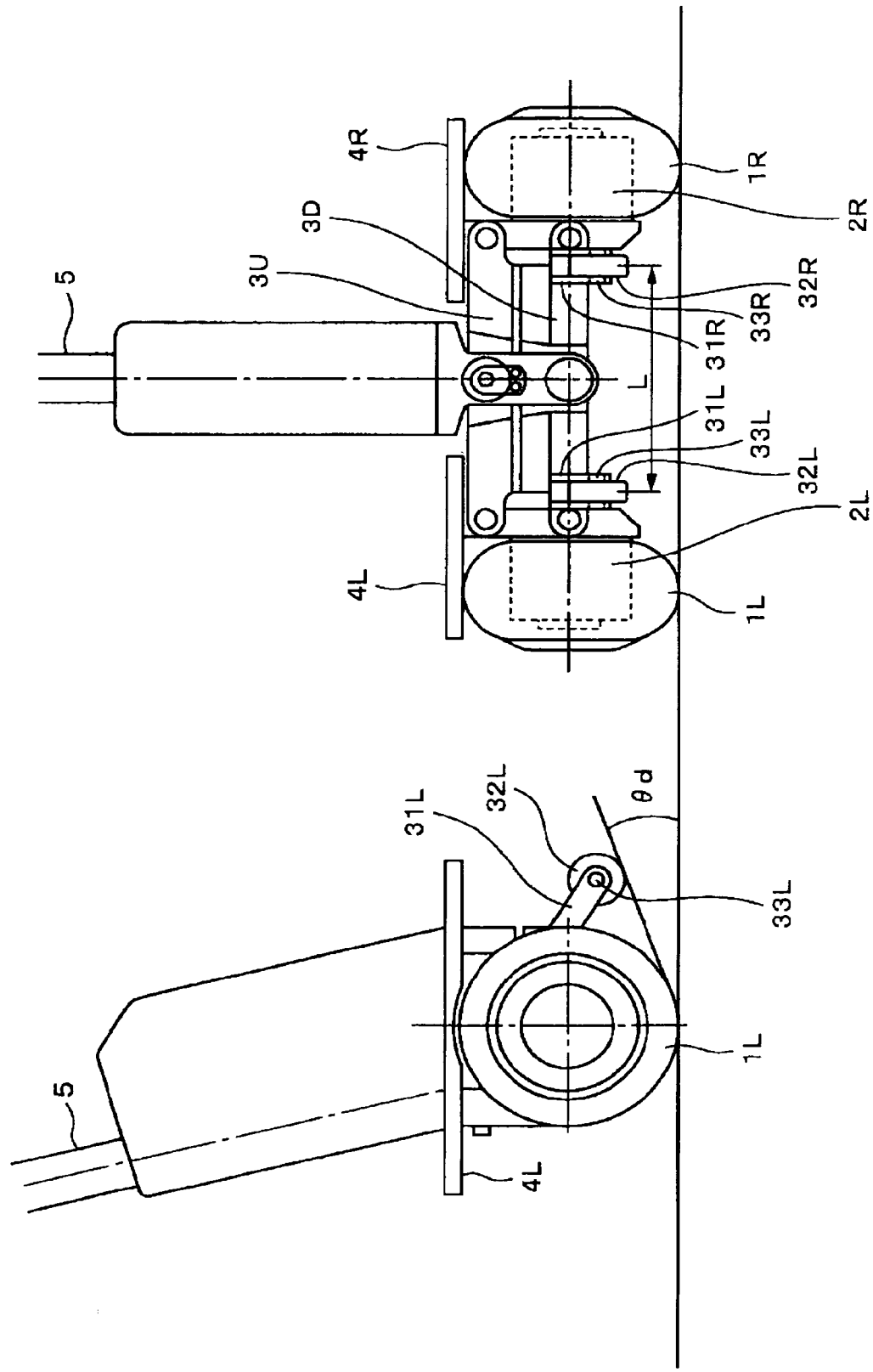

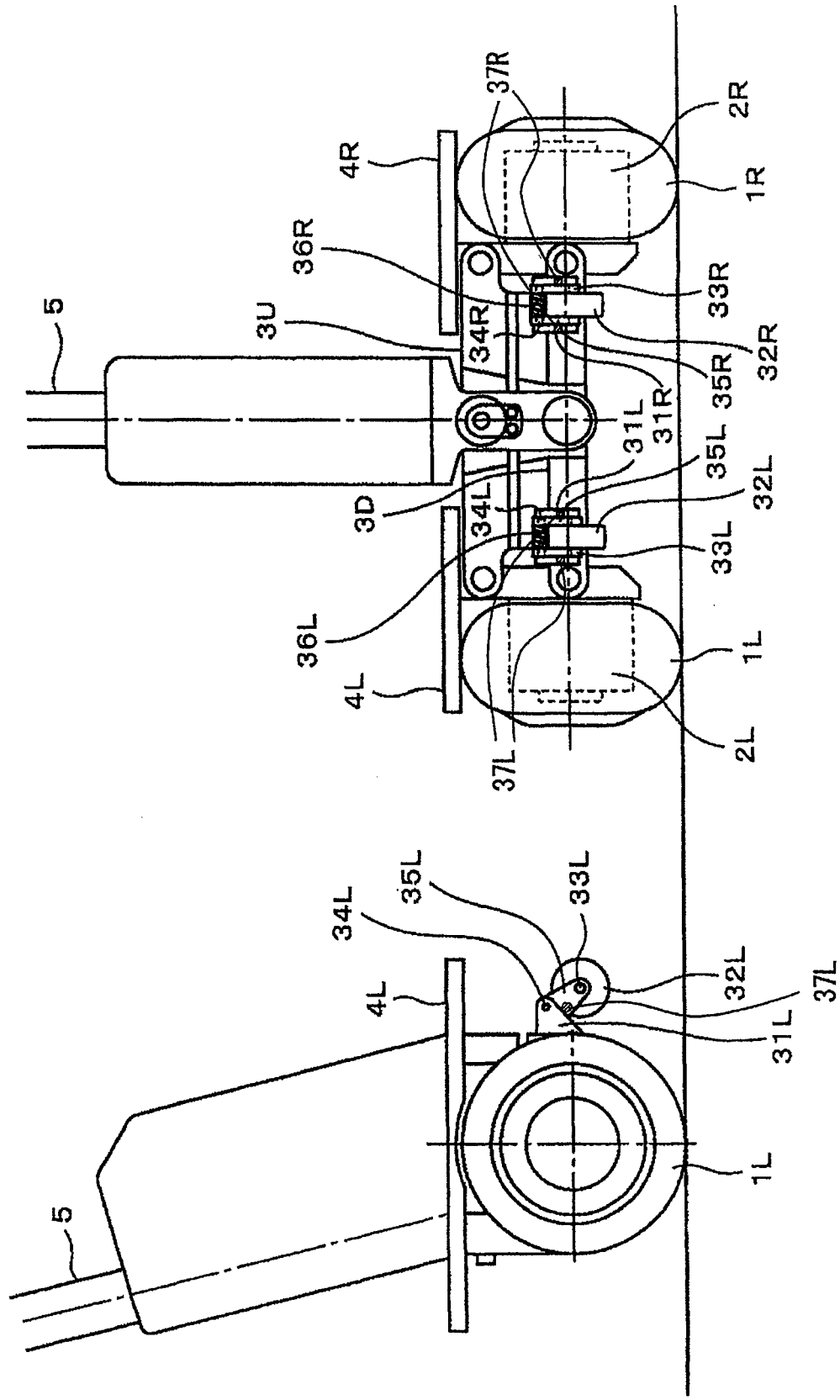

TRAVELING DEVICE

BACKGROUND OF THE INVENTION

1. Field of the Invention

The present invention relates to a traveling device suitable for use in a coaxial two-wheeled vehicle having two wheels disposed on an identical axial center line, for example. More particularly, the present invention proposes a traveling device that can support itself easily when not carrying a passenger and can be conveyed easily by being dragged.

2. Description of Related Art

In a conventional coaxial two-wheeled vehicle, attitude control is performed on the vehicle mainly in a pitch axis direction by detecting the tilt of the vehicle using a plurality of gyros or the like (see a related reference U.S. Pat. No. 5,971,091, for example).

Further, in a device for controlling respective wheels, a handle or a step that is constrained in a neutral position by the restoring force of a spring or the like is provided, an angle of absolute incline relative to the gravity axis thereof or an angle of relative incline relative to a base of the vehicle is detected, and a steering operation corresponding to the magnitude of the detected angle is realized (see a related reference Japanese Unexamined Patent Application Publication No. 2006-315666 (Kakinuma, U.S. patent application Ser. No. 11/402,975 filed on Apr. 13, 2006, Pub. No. US 2006/0260857 A1), for example).

However, neither U.S. Pat. No. 5,971,091 nor Japanese Unexamined Patent Application Publication No. 2006-315666 describe a technique with which a device can support itself when not carrying a passenger and be transported by being dragged easily, such a technique being the object of the invention according to the present application.

A coaxial two-wheeled vehicle such as that shown in FIGS. 11A and 11B, for example, is known as a vehicle that carries a person and travels on two wheels. FIG. 11A is a front view showing the constitution of a coaxial two-wheeled vehicle serving as a traveling device to which the present invention is applied, and FIG. 11B is a side view showing the constitution of the coaxial two-wheeled vehicle serving as the traveling device to which the present invention is applied. Note that in FIGS. 11A and 11B, the main overall constitution is substantially identical to that of the device illustrated in a related reference Japanese Unexamined Patent Application Publication No. 2006-315666.

In FIGS. 11A and 11B, two wheels 1L, 1R disposed in parallel are provided, and these wheels 1L, 1R are provided respectively with independent driving means (motors) 2L, 2R. The driving means 2L, 2R are connected by vehicle main bodies 3U, 3D divided into an upper side and a lower side. Although not shown in the drawing, a circuit device such as control means for controlling the tilt of the vehicle, which is detected by a sensor such as a gyro, and controlling driving of the driving means 2L, 2R in accordance with information such as the load on the vehicle, is provided in the vehicle main bodies 3U, 3D.

A step plate for carrying a driver is provided on an upper side of the vehicle main bodies 3U, 3D. The step plate is indicated by steps 4L, 4R divided into left and right sides, and these steps 4L, 4R are connected by a link mechanism (not shown) so as to be parallel at all times. A handle 5 is provided between the steps 4L, 4R. The handle 5 is provided at a predetermined forward tilt relative to the vehicle main bodies 3U, 3D, and the handle 5 is connected to the steps 4L, 4R by a link mechanism (not shown) such that a right angle is formed therebetween when the vehicle is seen from the front.

The specific constitution of a control device for this type of coaxial two-wheeled vehicle will now be described using the pattern diagram of a single wheel model shown in FIG. 12. Note that in an actual two-wheeled vehicle, the sensors of the step 4 are shared. Further, control of the motor 2 connected to the wheel 1 in the illustrated model is performed using independent control devices for the wheels 1L, 1R shown in FIGS. 11A and 11B.

In FIG. 12, pressure detection signals PS1, PS2, PS3, PS4 from a pressure sensor (not shown) installed in the step 4 and a table angle detection signal $\theta 0$ from an attitude sensor 8 constituted by a gyro sensor or an acceleration sensor connected to the step 4 are supplied to a central control device 91 provided in a control device 9. The detection signals PS1 to PS4 and $\theta 0$ and a table attitude command signal $\theta REF$ [d($\theta REF$)/dt] issued externally by a passenger or the like are then computed, whereupon a calculated rotation command $\omega ref$ is supplied to a motor control device 92.

Further, the wheel 1 and motor 2 are connected via a decelerator 93, and the motor 2 is provided with a rotation angle detector 94. A rotor rotary angle position signal $\Theta r$ from the rotary angle detector 94 is supplied to the motor control unit 92 in the control device 9. Thus, a drive current to be supplied to the motor 2, which is formed in accordance with the aforementioned rotary command $\omega ref$, is feedback-controlled, and as a result, driving of the wheel 1 is stabilized. Hence, the wheel 1 is driven with stability, and the driving thereof is controlled by the pressure detection signals PS1 to PS4 from the pressure sensor (not shown) and so on.

FIG. 13 shows mutual connection relationships in the system. In FIG. 13, the aforementioned pressure detection signals PS1 to PS4 and a roll axis angle detection signal PM from a roll axis angle detector (potentiometer) 12 provided in association with the handle 5, for example, are supplied to an attitude sensor circuit 13. A gyro sensor 21 and an acceleration sensor 22 are installed in the attitude sensor circuit 13. Accordingly, the aforementioned signals PS1 to PS4, the signal PM, a pitch angle $\bar{\omega}p$, a yaw angle $\bar{\omega}yaw$, and angle signals Ax, Ay, Az relating respectively to the X, Y and Z axes are extracted from the attitude sensor circuit 13.

These signals PS1 to PS4, PM, $\bar{\omega}p$, $\bar{\omega}yaw$, and Ax, Ay, Az are supplied to the central control device 91 in the control device 9. An operation signal from a power switch 14 provided on a grip portion of the handle 5, for example, is also supplied to the central control device 91. Hence, in the central control device 91, rotation commands $\bar{\omega}ref1$, $\bar{\omega}ref2$ for the left and right wheels 1L, 1R (not shown) are calculated and supplied to motor control units 92L, 92R. Further, signals from rotation angle detectors 94L, 94R are supplied to the motor control units 92L, 92R to drive the motors 2L, 2R.

Further, power from a battery 15 is supplied to a power circuit 95. 24V motor power, for example, is supplied to the motor control units 92L, 92R from the power circuit 95, and 5V control power, for example, is supplied to the attitude sensor circuit 13 and the central control device 91. Note that the power circuit 95 is provided with a power switch 16 for controlling power supply to each unit. As a result, the motors 2L, 2R are driven, and by driving the motors 2L, 2R, the wheels 1L, 1R are driven, thereby causing the coaxial two-wheeled vehicle to travel.

Incidentally, in this type of traveling device, as shown in FIGS. 14A and 14B, for example, a situation in which the device is dragged by the handle 5 while not carrying a passenger may arise. In such a case, if a motor (not shown) is connected to the wheel 1, resistance is generated in the rotation of the wheel 1 due to the influence of the decelerator and so on, even when torque is not generated in the motor. This resistance Ff is in inverse proportion to a diameter R of the wheel 1 when a frictional torque Tf is constant, and therefore, when the diameter is small, as shown in FIG. 14B, the resistance is much larger than when the diameter is large, as shown in FIG. 14A. Hence, in certain cases it may be impossible to drag the traveling device easily.

Furthermore, when the motor is not driven in the traveling device described above, the device cannot support itself. Therefore, when not carrying a passenger, then device is propped against a wall, or a dedicated holder or stand is used. When no such wall, holder, or stand is present, the device is laid on its side, and in all of these cases, the procedure is troublesome. In view of this, the applicant of the present application has proposed a technique for achieving self-support through drive-control of the motor (Japanese Unexamined Patent Application Publication No. 2007-336785), but this technique is problematic in that power consumption increases in the long term.

This application has been designed in consideration of these points, and the problems to be solved thereby are that in a conventional device, self-support cannot be achieved easily. Further, when an attempt is made to convey the device by dragging it, resistance increases dramatically, particularly if the diameter of the wheel is small, and therefore the device cannot be dragged easily.

SUMMARY OF THE INVENTION

To solve the problems described above and achieve the objects of the present invention, an invention described in claim 1 is a traveling device comprising a plurality of wheels disposed in parallel, a vehicle main body provided between the plurality of wheels and installed with a mechanism for controlling driving of the plurality of wheels, and a handle that is mounted on the vehicle main body, wherein a caster that contacts the ground when the vehicle main body is tilted to a predetermined angle, causing the handle and the vehicle main body to support themselves, is provided in relation to the vehicle main body.

In the traveling device of the present invention, the caster enables the vehicle main body to be dragged by the handle when the vehicle main body is tilted to or above the predetermined angle.

In the traveling device of the present invention, the caster comprises a movable portion that is constrained by an elastic member, and the movable portion is constituted such that when drive control of the plurality of wheels is not underway, the position of the caster is fixed relative to a reactive force from a ground surface so that the handle and the vehicle main body can support themselves and be conveyed, while during drive control of the plurality of wheels, the position of the caster is displaced by the reactive force from the ground surface when the caster contacts the ground surface so that travel of the vehicle main body is not impaired.

In the traveling device of the present invention, the caster comprises a movable portion that is constrained to first and second positions by an elastic member, and when drive control of the plurality of wheels is not underway, the movable portion is set in the first position to fix the position of the caster relative to a reactive force from a ground surface so that the handle and the vehicle main body can support themselves and be conveyed, and during drive control of the plurality of wheels, the movable portion is set in the second position so that the caster does not contact the ground surface.

In the traveling device of the present invention, the caster comprises a movable portion that is driven by an actuator, and the movable portion is constituted such that through an operation of the actuator, the position of the caster is fixed relative to a reactive force from a ground surface when drive control of the plurality of wheels is not underway so that the handle and the vehicle main body can support themselves and be conveyed, while during drive control of the plurality of wheels, the position of the caster is displaced so that travel of the vehicle main body is not impaired.

In the traveling device of the present invention, a ground contact member constituted by an elastic member is provided on a point which contacts the ground when the vehicle main body is tilted to the predetermined angle.

According to the traveling device of the present invention, a caster that contacts the ground when the vehicle main body is tilted to a predetermined angle, causing the handle and the vehicle main body to support themselves, is provided in relation to the vehicle main body, and therefore the device can support itself easily. Further, when an attempt is made to convey the device by dragging it, the device can be dragged easily using the caster.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 1A is a side view showing the constitution of a first embodiment of a coaxial two-wheeled vehicle to which a traveling device according to the present invention is applied;

FIG. 1B is a front view showing the constitution of the first embodiment of the coaxial two-wheeled vehicle to which the traveling device according to the present invention is applied;

FIG. 4A is a side view showing the constitution of a second embodiment of the coaxial two-wheeled vehicle to which the traveling device according to the present invention is applied;

FIG. 4B is a front view showing the constitution of the second embodiment of the coaxial two-wheeled vehicle to which the traveling device according to the present invention is applied;

DETAILED DESCRIPTION OF THE PREFERRED EMBODIMENTS

Figures 11A, 11B:
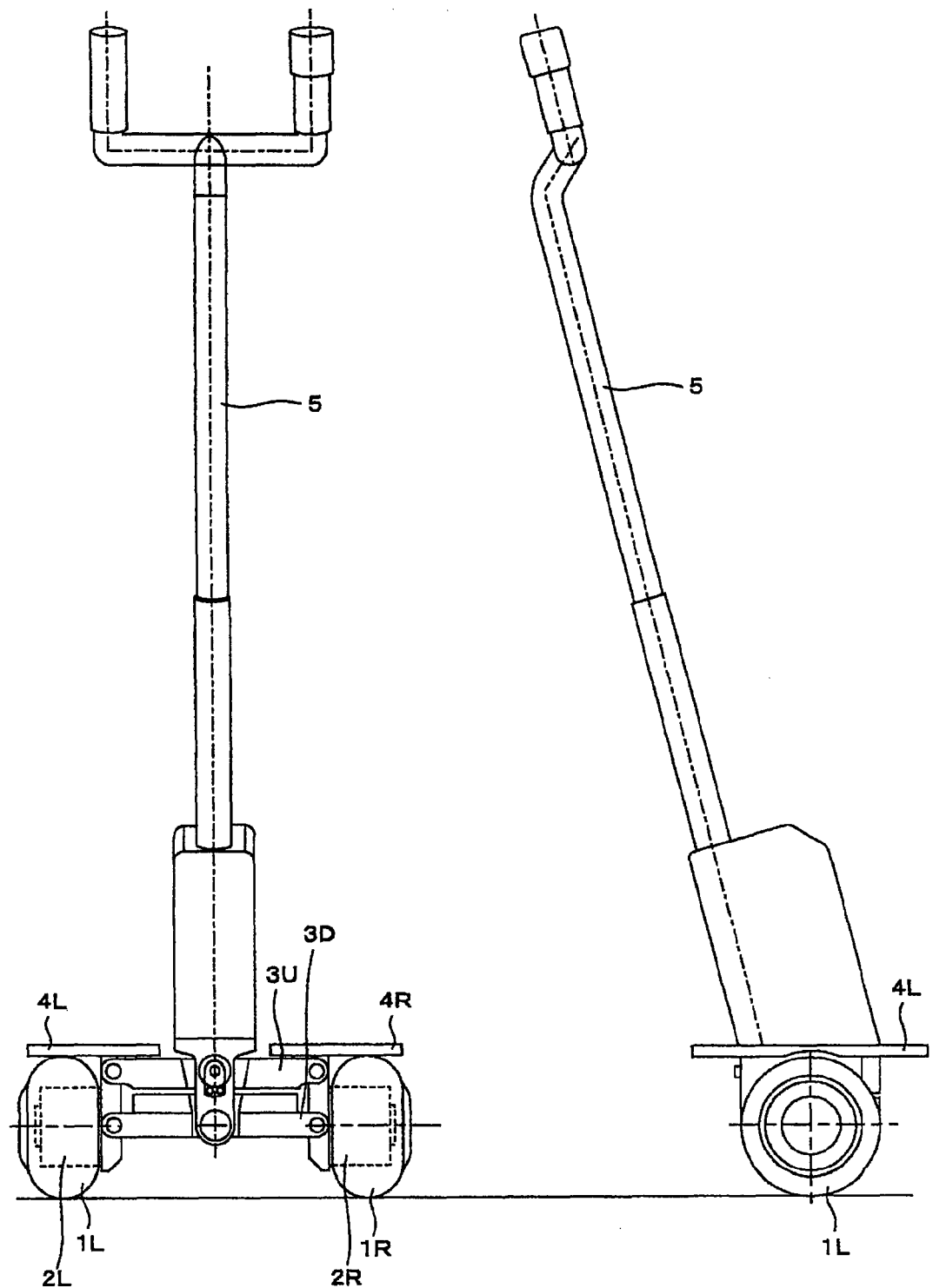
FIG. 11A is a front view showing the constitution of the traveling device to which the present invention is applied.
FIG. 11B is a side view showing the constitution of the traveling device to which the present invention is applied.
Figure 12:
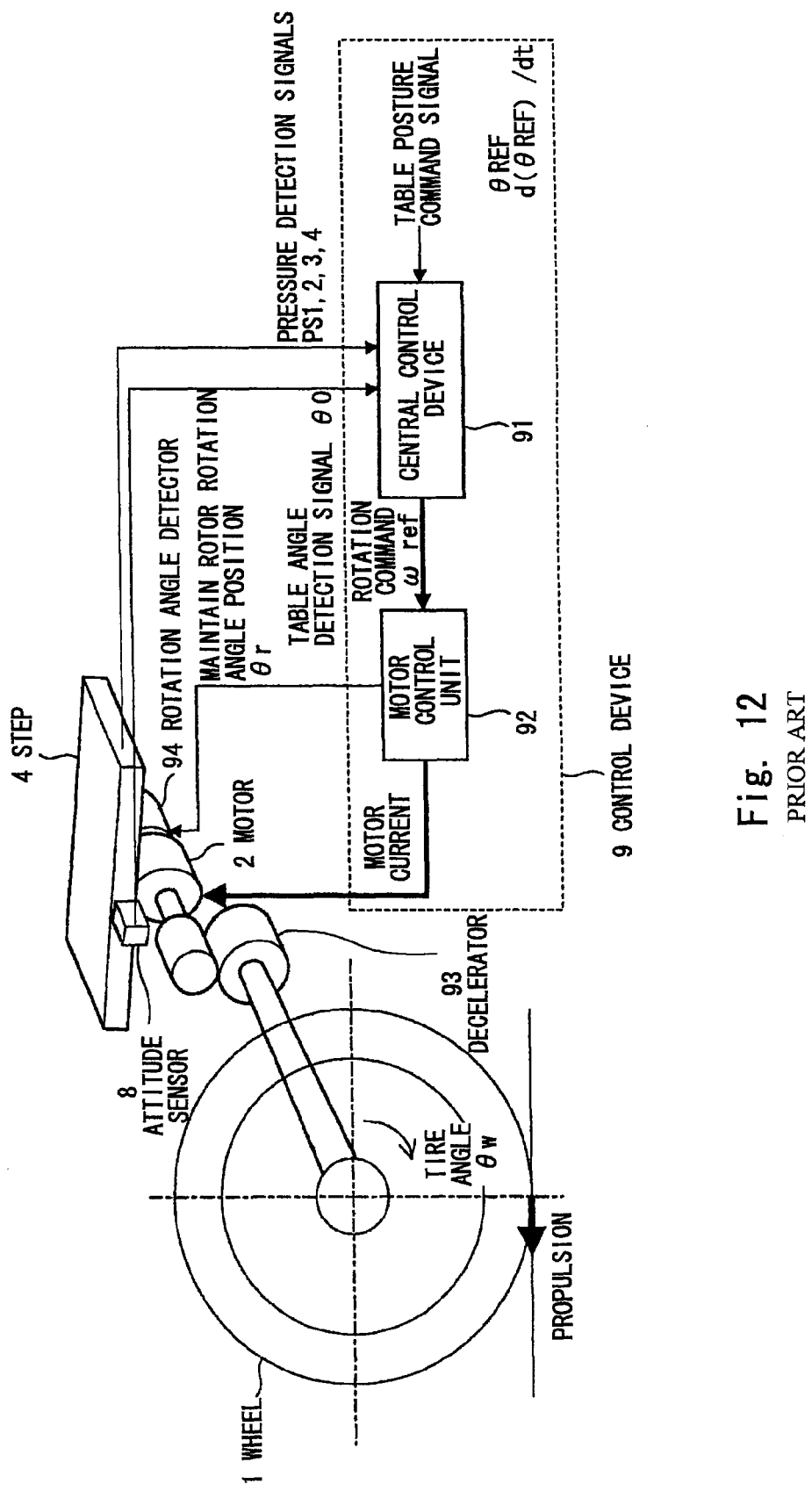
FIG. 12 is a control structure diagram of a single wheel model.
Figure 13:
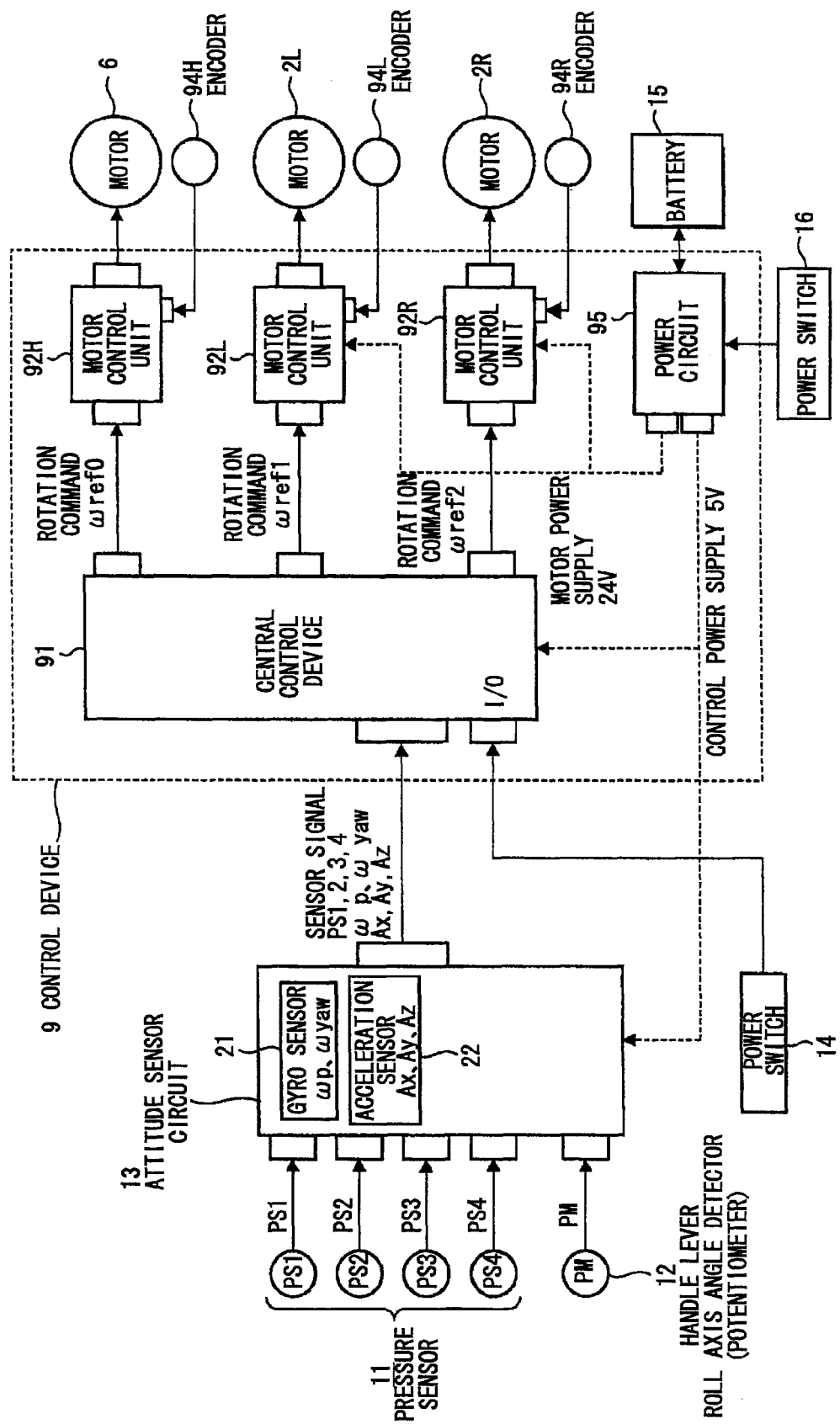
FIG. 13 is a system diagram illustrating the traveling device.
Figures 14A, 14B:
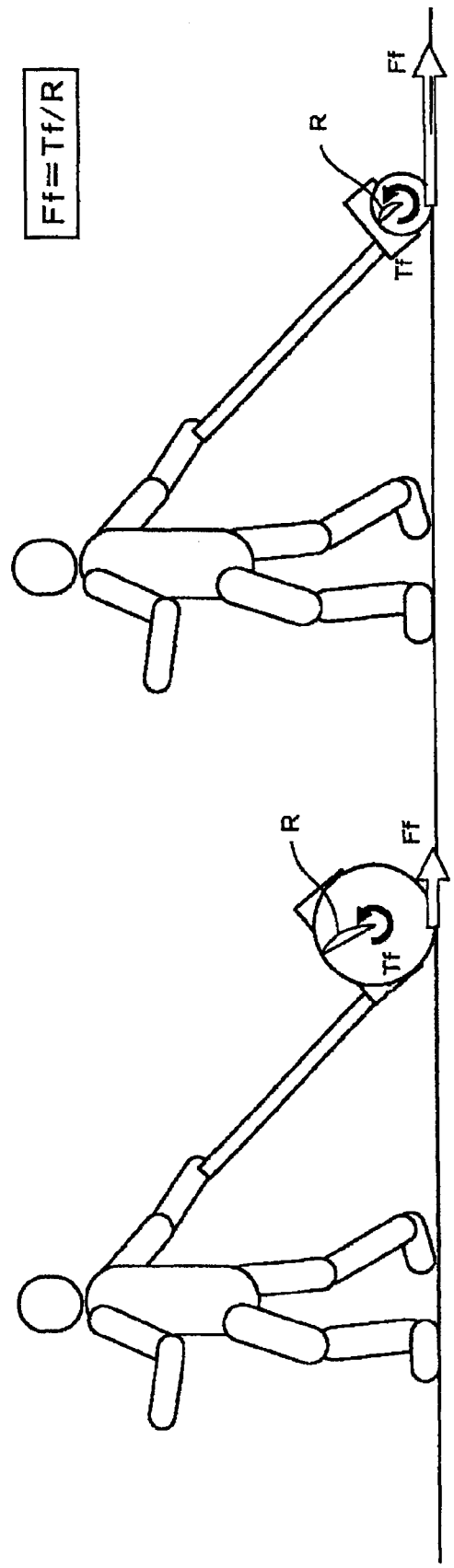
FIG. 14A is a view illustrating an operation thereof.
FIG. 14B is a view illustrating an operation thereof.

The present invention will be described below with reference to the drawings. FIG. 1A is a side view showing the constitution of the main parts of a first embodiment of a coaxial two-wheeled vehicle to which the traveling device according to the present invention is applied. FIG. 1B is a front view showing the constitution of the main parts of the first embodiment of the coaxial two-wheeled vehicle to which the traveling device according to the present invention is applied. Note that in FIGS. 1A and 1B, the main constitution is substantially identical to that of the device illustrated in FIGS. 11A and 11B and Japanese Unexamined Patent Application Publication No 2006-315666.

In FIGS. 1A and 1B, two wheels 1L, 1R are disposed in parallel, and these wheels 1L, 1R are provided respectively with independent driving means (motors) 2L, 2R. The driving means 2L, 2R are connected by vehicle main bodies 3U, 3D divided into an upper side and a lower side. Although not shown in the drawing, a circuit device such as control means for controlling the tilt of the vehicle, which is detected by a sensor such as a gyro, and controlling driving of the driving means 2L, 2R in accordance with information such as the load on the vehicle, is provided in the vehicle main bodies 3U, 3D.

A step plate for carrying a driver is provided on an upper side of the vehicle main bodies 3U, 3D. The step plate is indicated by steps 4L, 4R divided into left and right sides, and these steps 4L, 4R are connected by a link mechanism (not shown) so as to be parallel at all times. A handle 5 is provided between the steps 4L, 4R. The handle 5 is provided at a predetermined forward tilt relative to the vehicle main bodies 3U, 3D, and the handle 5 is connected to the steps 4L, 4R by a link mechanism (not shown) such that a right angle is formed therebetween when the vehicle is seen from the front.

Further, casters 32L, 32R are provided on a rear side of the lower side vehicle main body 3D via support portions 31L, 31R. The casters 32L, 32R are rotated freely by rotary shafts 33L, 33R including a bearing or the like. Further, the casters 32L, 32R are disposed such that a tangent linking the respective outer peripheries of the casters 32L, 32R to the wheels 1L, 1R forms a predetermined angle θd relative to a road surface. The angle θd is set to be larger than a maximum tilt (departure angle) within an assumed normal traveling range of the vehicle.

Figure 2B:
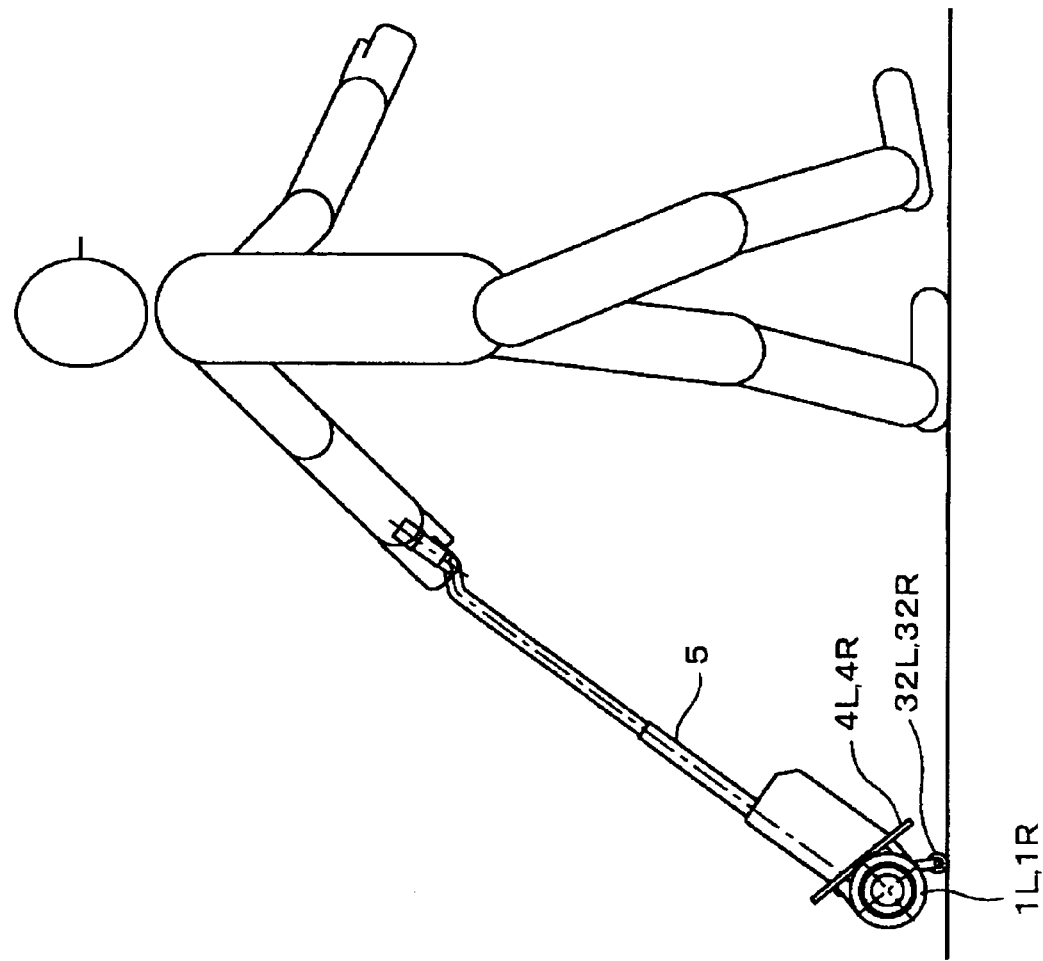
FIG. 2B is a view illustrating an operation thereof.
Figure 2A:
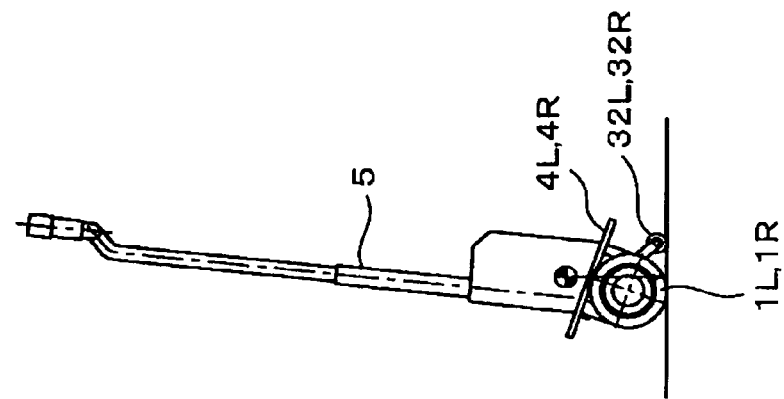
FIG. 2A is a view illustrating an operation thereof.

As shown in FIG. 2A, the casters 32L, 32R contact the road surface when the device is tilted backward by a predetermined amount, and in this state, the gravitational center of the device is inside a square formed by the wheels 1L, 1R and the casters 32L, 32R such that the device supports itself. Further, when the device is dragged, the entire device is tilted backward beyond the angle θd, as shown in FIG. 2B, such that the wheels 1L, 1R are separated from the road surface, and as a result, no resistance is generated by the wheels 1L, 1R. The casters 32L, 32R are rotated freely, and therefore dragging can be performed easily.

Note that the casters 32L, 32R are provided in left-right symmetry and at a separation distance L that is as large as possible in order to increase stability during self-support and dragging. Further, the casters 32L, 32R are not limited to the rear side of the lower side vehicle main body 3D, as described above, and the present invention may be implemented with the casters 32L, 32R provided on the front or to the side of the lower side vehicle main body 3D. Hence, according to the traveling device of the present invention, the device can support itself easily using the casters 32L, 32R, and the device can be dragged/conveyed easily using the casters 32L, 32R.

Figure 3:
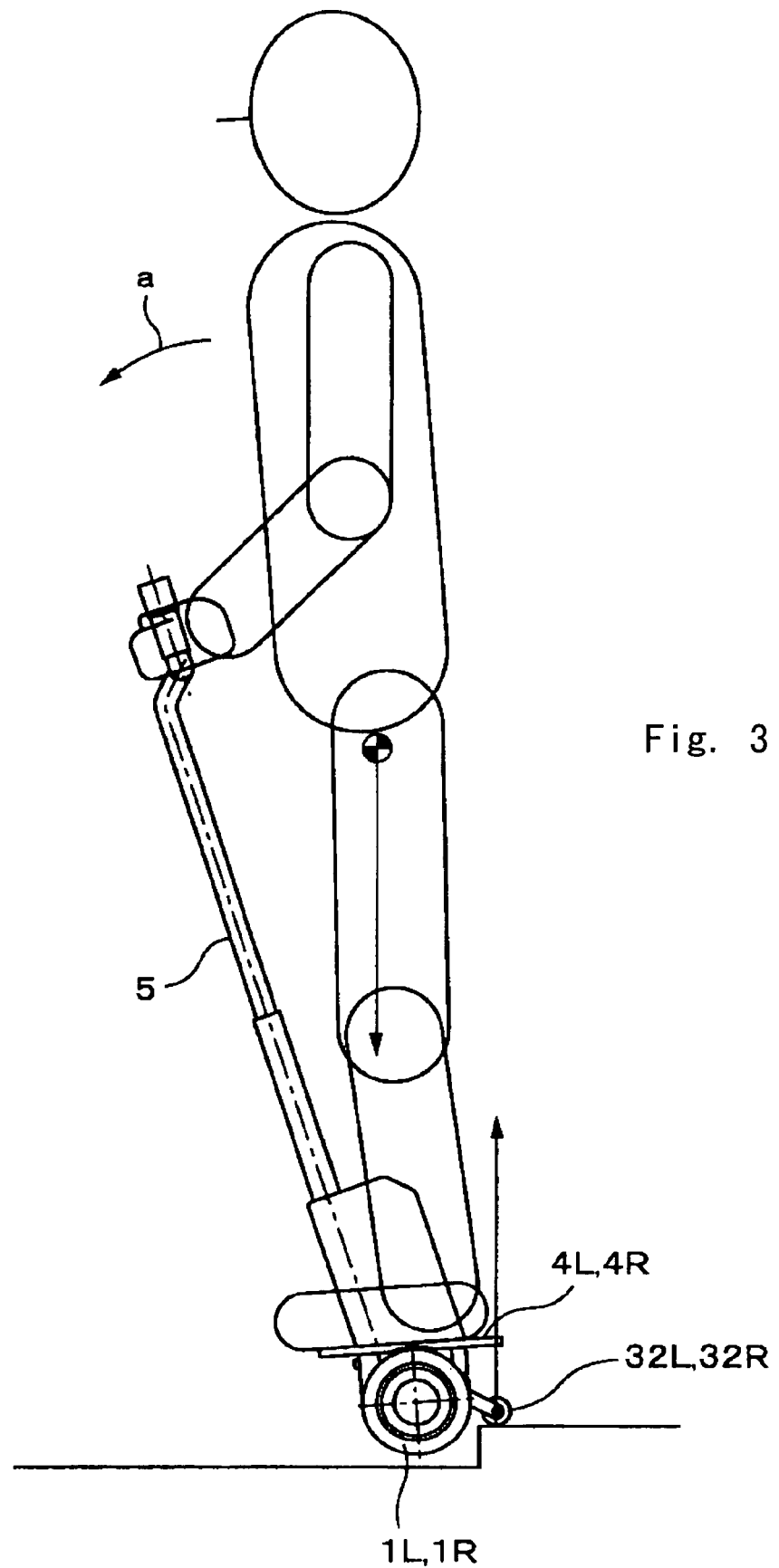
FIG. 3 is a view illustrating an operation thereof.

Incidentally, the traveling device of the present invention was originally designed for travel on level ground, and therefore, when an attempt is made to descend a step, for example, the casters 32L, 32R of the constitution described above may abut against the upper portion of the step, as shown in FIG. 3. In this case, the entire device tilts forward as shown by an arrow a in FIG. 3, causing the center of gravity to move forward. In a device that performs travel control in accordance with the center of gravity position, such as the device described above, this unintentional movement of the center of gravity may invite operational instability.

FIG. 4A is a side view of a constitution for preventing forward tilting even when the casters 32L, 32R abut against the upper portion of a step, which serves as a second embodiment of the coaxial two-wheeled vehicle to which the traveling device of the present invention is applied. FIG. 4B is a front view of a constitution for preventing forward tilting even when the casters 32L, 32R abut against the upper portion of a step, which serves as a second embodiment of the coaxial two-wheeled vehicle to which the traveling device of the present invention is applied.

In FIGS. 4A and 4B, the support portions 31L, 31R shown in FIGS. 1A and 1B are provided as first support portions, and second support portions 35L, 35R are provided on the first support portions 31L, 31R via rotary shafts 34L, 34R. Further, the casters 32L, 32R are provided on the second support portions 35L, 35R via the rotary shafts 33L, 33R. The second support portions 35L, 35R are provided with a stop mechanism (37L, 37R) and biased in the direction of the wheels 1L, 1R by the force of torsion springs 36L, 36R, thereby ensuring that the second support portions 35L, 35R are limited to the position shown in the drawing and do not move further in the direction of the wheels 1L, 1R.

Figure 5B:
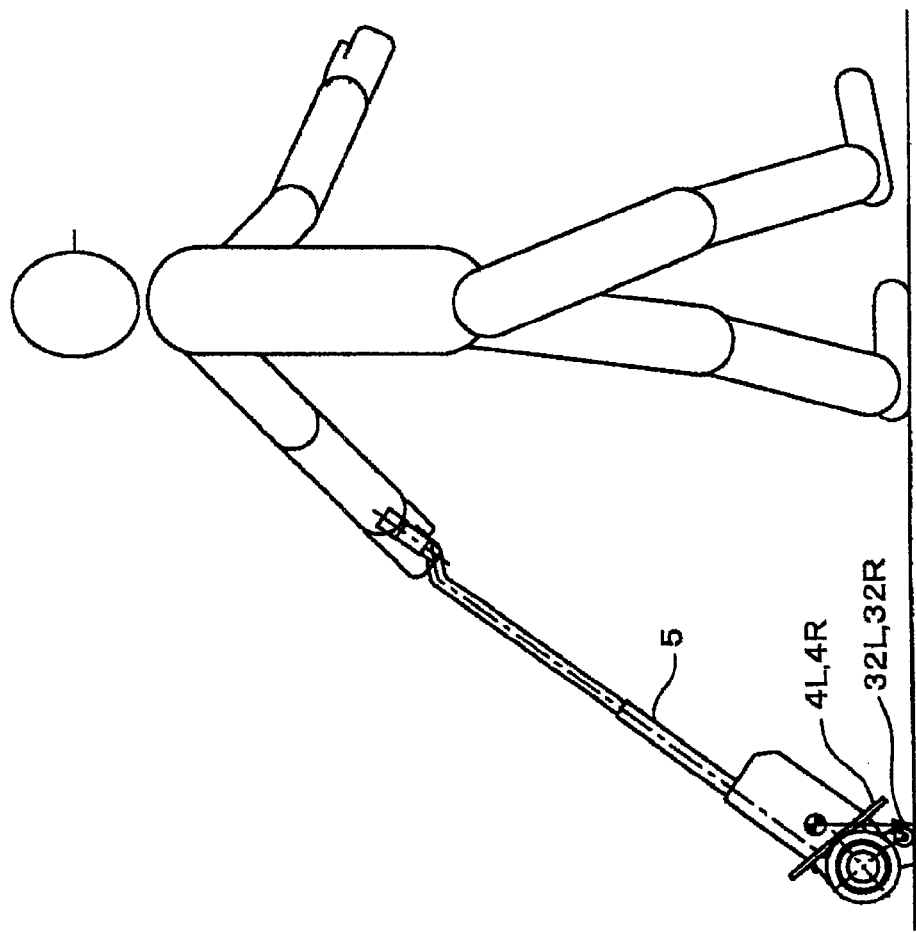
FIG. 5B is a view illustrating an operation thereof.
Figure 5A:
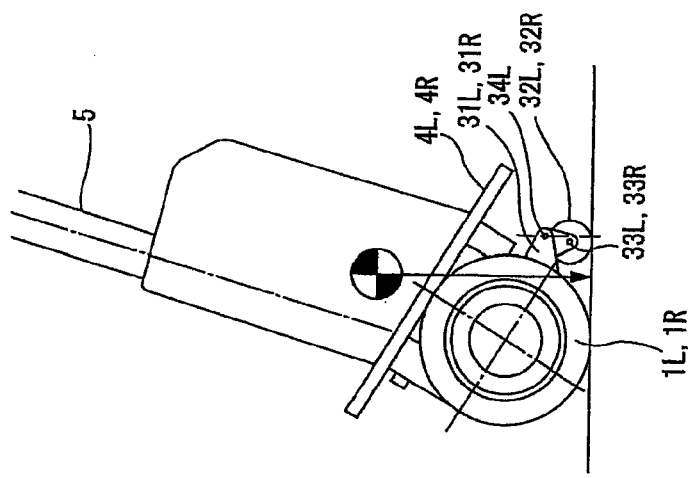
FIG. 5A is a view illustrating an operation thereof.

Hence, in this device, when the casters 32L, 32R contact the ground at a ground contact point that is further toward the vehicle side than a perpendicular extending from the rotary shafts 33L, 33R to the ground surface, as shown in FIG. 5A, a reactive force acting on the casters 32L, 32R from the road surface causes the second support portions 35L, 35R to move in the direction of the wheels 1L, 1R. As a result, the casters 32L, 32R are stopped by the stop mechanisms (37L, 37R), and in this state, the center of gravity of the device is inside the square formed by the vehicle wheels 1L, 1R and the casters 32L, 32R so that the device supports itself.

As shown in FIG. 5B, when the device is dragged, the reactive force from the ground surface that acts on the casters 32L, 32R from the road surface causes the second support portions 35L, 35R to move in the direction of the wheels 1L, 1R. As a result, the casters 32L, 32R are stopped by the stop mechanisms (37L, 37R), and in this state, the wheels 1L, 1R separate from the road surface such that no resistance is generated by the wheels 1L, 1R. Moreover, the casters 32L, 32R are rotated freely, and therefore dragging can be performed easily.

Figure 6:
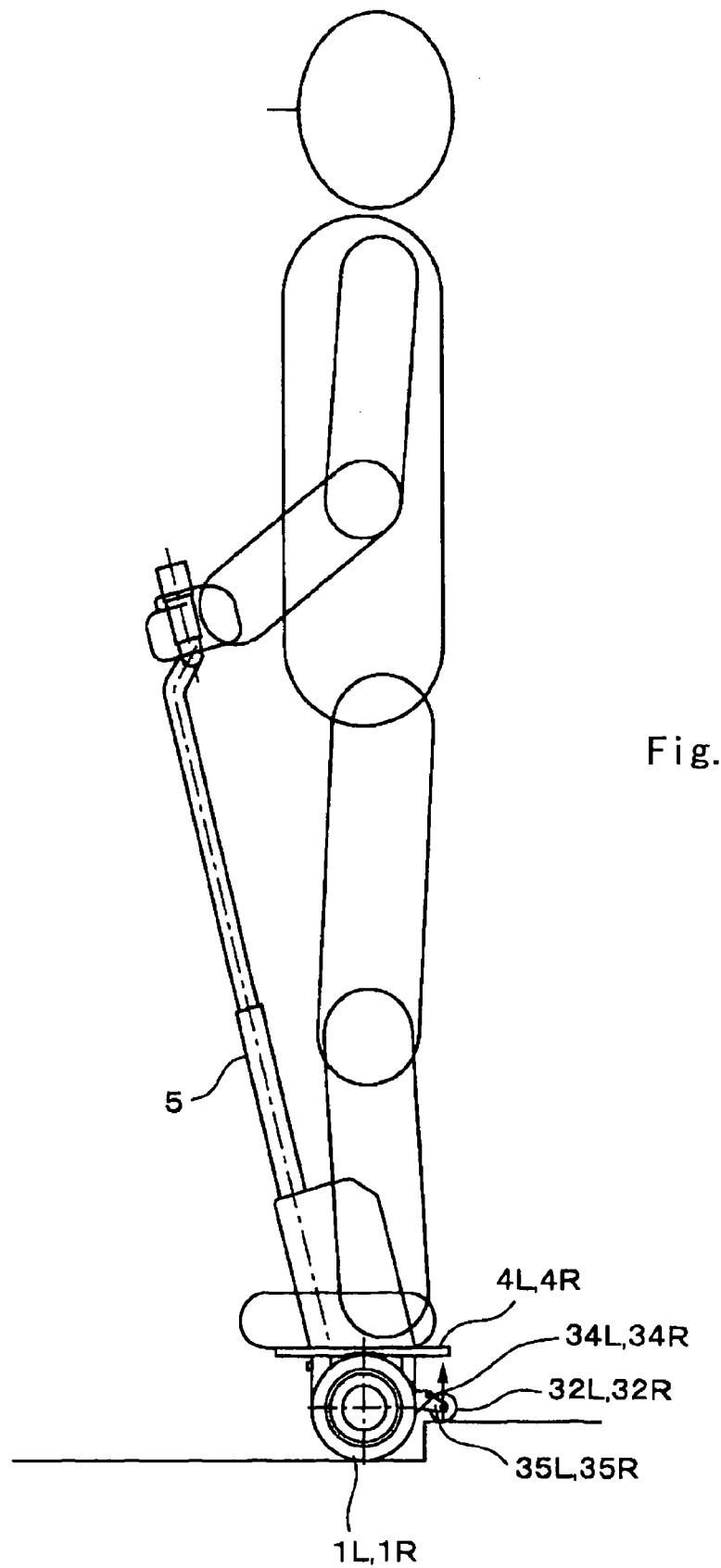
FIG. 6 is a view illustrating an operation thereof.

Furthermore, when an attempt is made to descend a step during travel using this device, the casters 32L, 32R move away from the wheels 1L, 1R in the opposite direction thereto when the casters 32L, 32R abut against the upper portion of the step, as shown in FIG. 6. As a result, the reactive force from the ground surface that acts on the casters 32L, 32R from the upper portion of the step is resisted only by the torsion springs 36L, 36R, therefore becoming slight, and a large force for moving the center of gravity position of the entire device is not generated. Hence, according to this device, stable traveling is possible at all times.

Figures 7A, 7B:
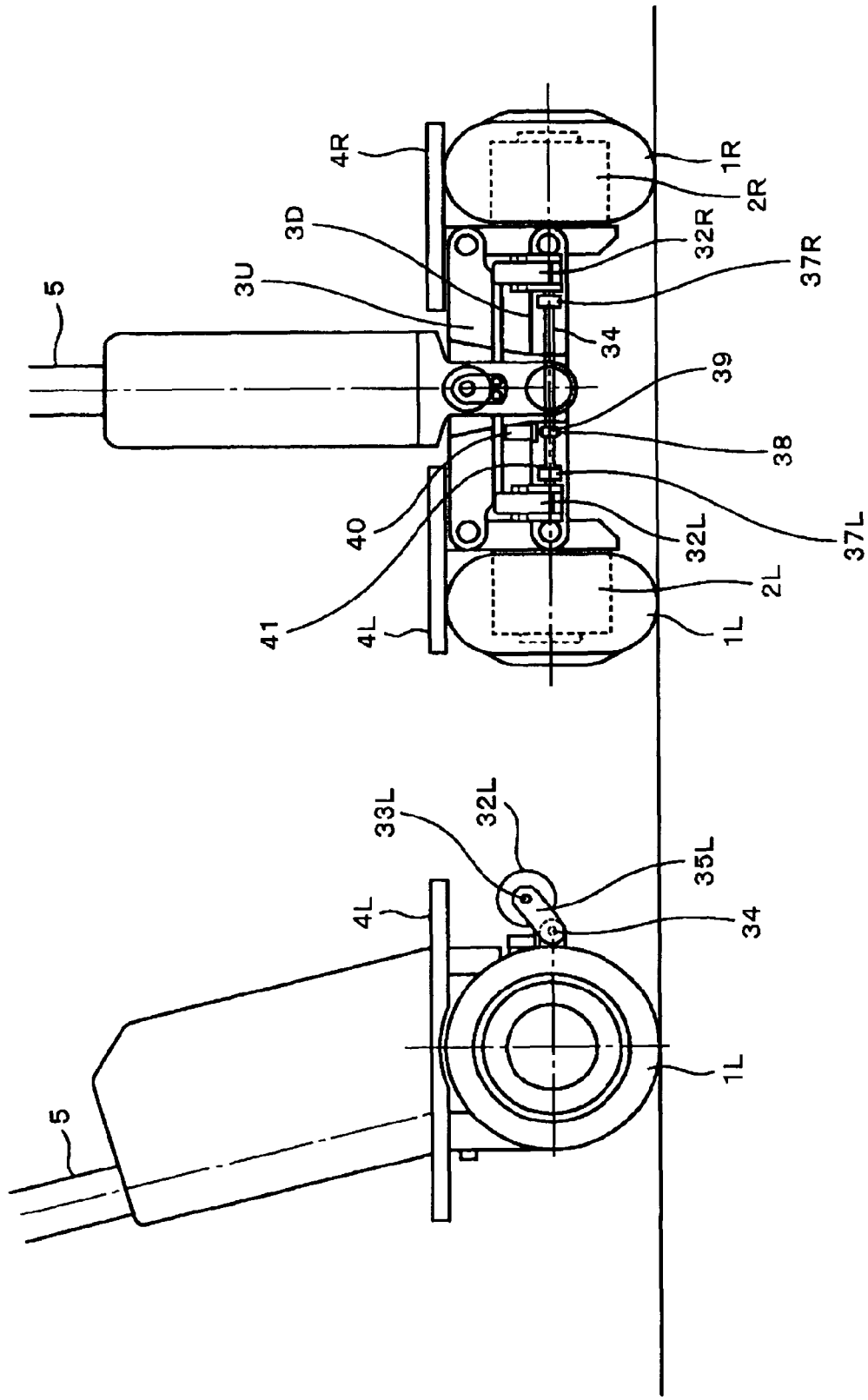
FIG. 7A is a side view showing the constitution of a third embodiment of the coaxial two-wheeled vehicle to which the traveling device according to the present invention is applied.
FIG. 7B is a front view showing the constitution of the third embodiment of the coaxial two-wheeled vehicle to which the traveling device according to the present invention is applied.

FIG. 7A is a side view showing a constitution for preventing the casters 32L, 32R from abutting against the upper portion of a step when descending a step during travel, which serves as a third embodiment of the coaxial two-wheeled vehicle to which the traveling device of the present invention is applied. FIG. 7B is a front view showing a constitution for preventing the casters 32L, 32R from abutting against the upper portion of a step when descending a step during travel, which serves as a third embodiment of the coaxial two-wheeled vehicle to which the traveling device of the present invention is applied.

In FIGS. 7A and 7B, a single rotary shaft 34 is employed in place of the rotary shafts 34L, 34R shown in FIGS. 4A and 4B. The rotary shaft 34 is supported by bearing portions 37L, 37R and provided with a worm gear 38 and a worm wheel 39 in a predetermined portion so that the rotary shaft 34 can be driven to rotate by a motor 40. Further, two contact switches 41 are provided on either one of the bearing portions 37L, 37R (the support portion 35L side in the drawing) and a single projection is provided on either one of the rotary shafts 34L, 34R (the rotary shaft 34L side in the drawing) so that a determination can be made as to whether the position of the casters 32L, 32R corresponds to the position shown in FIG. 2A or FIG. 5A, or the position shown in FIG. 7A.

Figure 8:
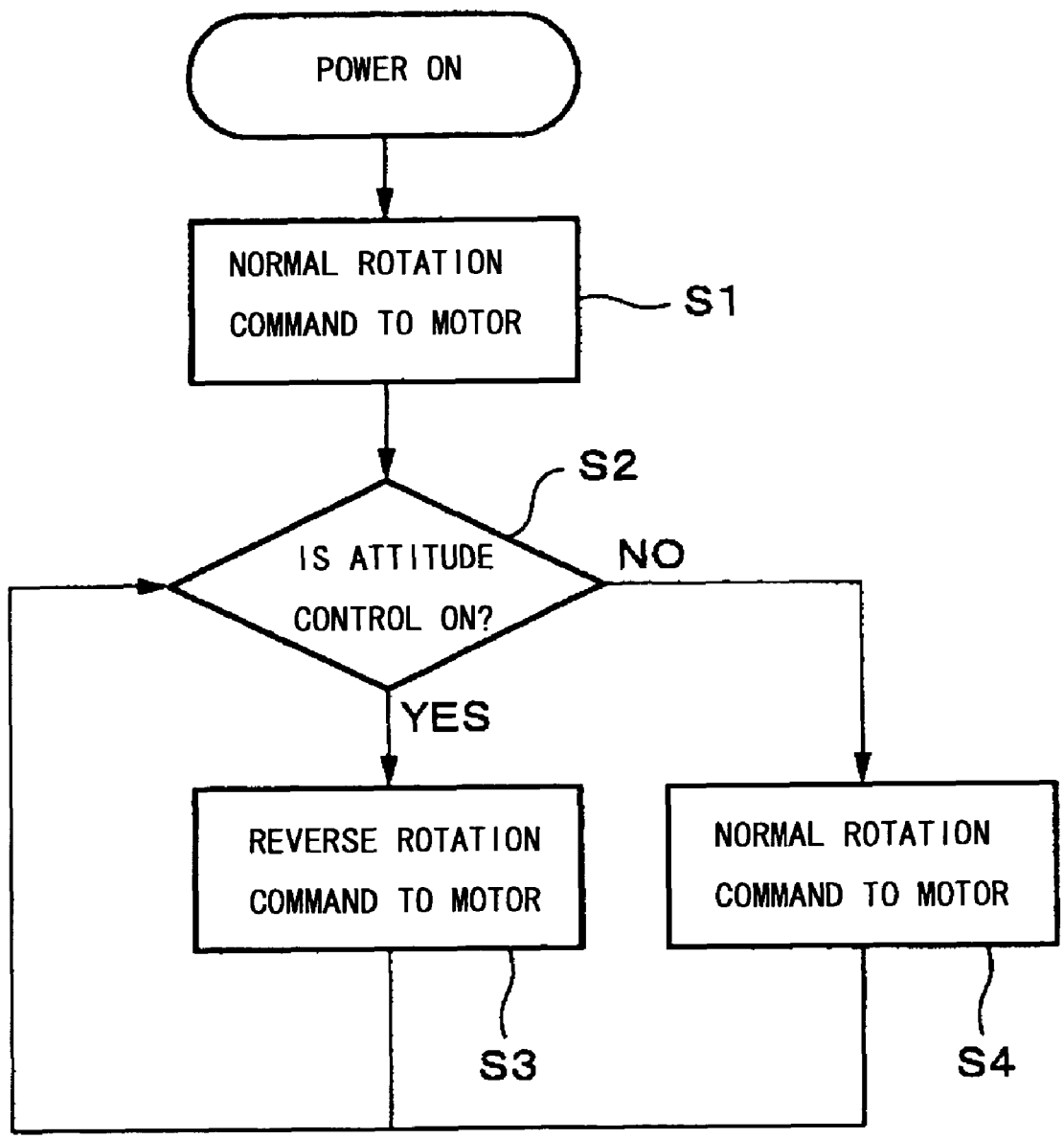
FIG. 8 is a flowchart illustrating an operation thereof.

FIG. 8 is a flowchart illustrating a processing operation performed to drive the aforementioned motor 40. In FIG. 8, processing begins when power is introduced, and first, a normal rotation command is output to the motor 40 (step S1). Next, a determination is made as to whether or not attitude control is ON (step S2), and if so (Yes), a reverse rotation command is output to the motor 40 (step S3). If attitude control is not ON in the step S2 (No), a normal rotation command is output to the motor 40 (step S4). The steps S2 to S4 are then repeated.

Hence, when the casters reach an upper limit position or a lower limit position, the contact switch is depressed such that the drive circuit of the motor 40 is cut off, and as a result, the motor is halted. When the motor is halted, the position of the casters is locked by the action of the worm gear/worm wheel.

Figure 9B:
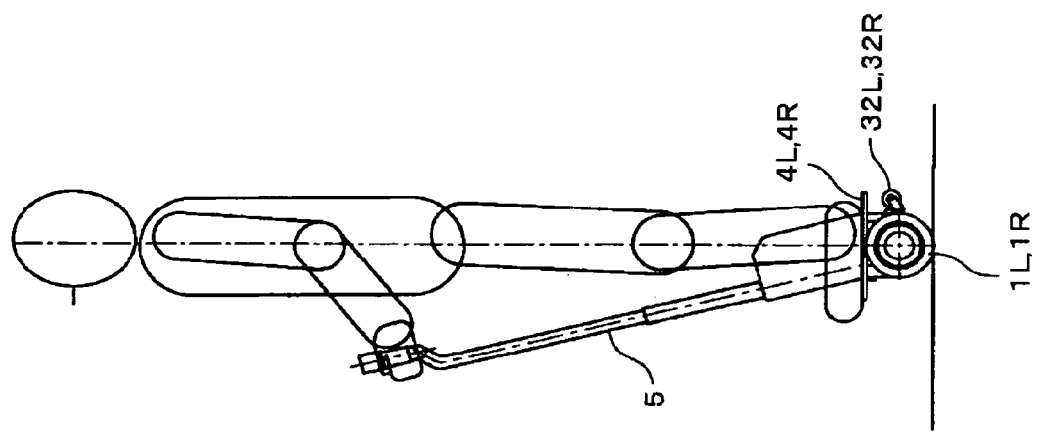
FIG. 9B is a view illustrating an operation thereof.
Figure 9A:
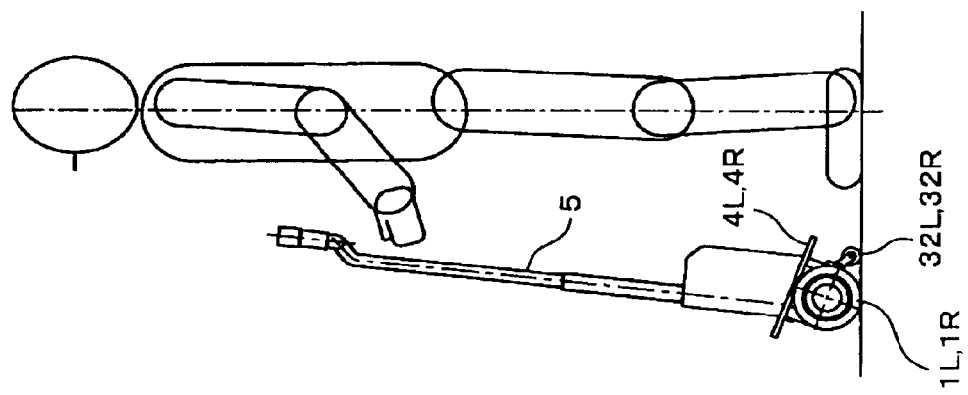
FIG. 9A is a view illustrating an operation thereof.

Hence, when attitude control is OFF, the casters 32L, 32R are positioned as shown in FIG. 2A or FIG. 5A, and when attitude control is ON, the casters 32L, 32R are positioned as shown in FIG. 7A. Accordingly, when attitude control is OFF, the device supports itself using the casters 32L, 32R, as shown in FIG. 9A. Further, when attitude control is ON, the casters 32L, 32R do not impede travel, as shown in FIG. 9B, and moreover, the casters 32L, 32R do not abut against the upper portion of a step when descending the step during travel.

Note that in the third embodiment of a coaxial two-wheeled vehicle to which the traveling device of the present invention is applied, a mechanism with which the casters 32L, 32R are respectively biased to the aforementioned two positions by a spring, for example, may be provided. In this case, the passenger switches the position using a foot during mounting and alighting. Alternatively, a constitution in which the casters 32L, 32R are flipped up by operating a plunger or the like when attitude control is ON may be provided.

Further, in each of the embodiments described above, when the road surface is inclined in the front-rear direction of the vehicle during self-support, resistance generated by the frictional torque of the driving portion prevents the vehicle from moving in the direction of the incline. However, when the incline is sharp or the force of an external disturbance is applied, the vehicle may move against the frictional torque. This problem is solved by a fourth embodiment shown in FIGS. 10A and 10B.

Figure 10A:
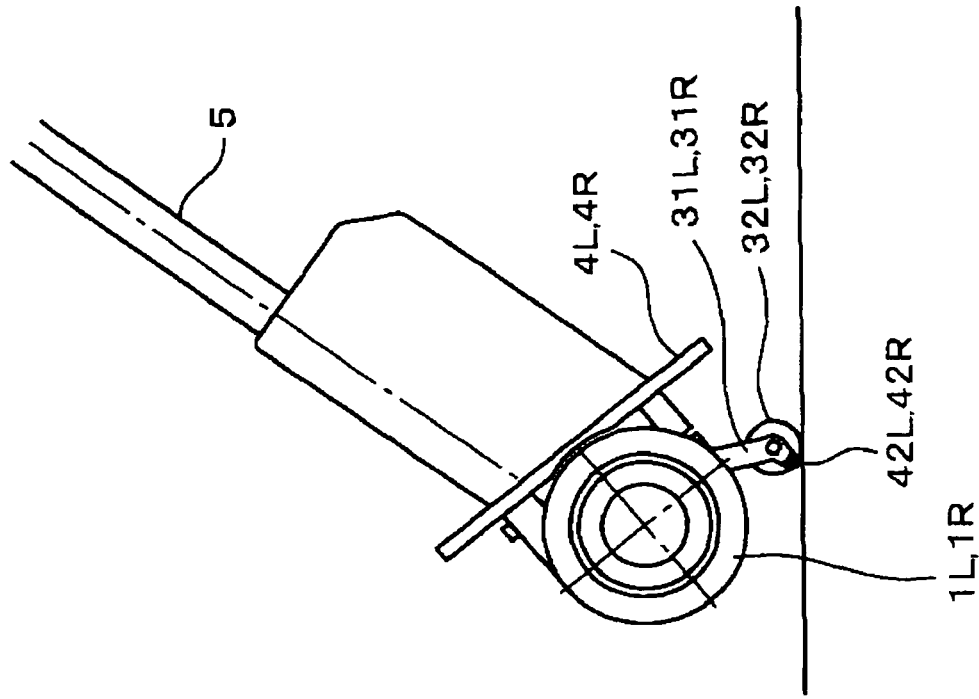
FIG. 10A is a side view showing the constitution and an operation of a fourth embodiment of the coaxial two-wheeled vehicle to which the traveling device according to the present invention is applied.

In the fourth embodiment, the support portions 31L, 31R (or 35L, 35R) of the casters 32L, 32R have grounding portions 42L, 42R that contact the ground surface. The grounding portions 42L, 42R are constituted by a rubber material or the like having a high frictional coefficient with the ground surface. Hence, during self-support, the grounding portions 42L, 42R, and not the casters 32L, 32R, contact the ground surface, as shown in FIG. 10A. As a result of the friction generated by the grounding portions 42L, 42R, the vehicle is unlikely to move relative to an incline or an external disturbance.

Figure 10B:
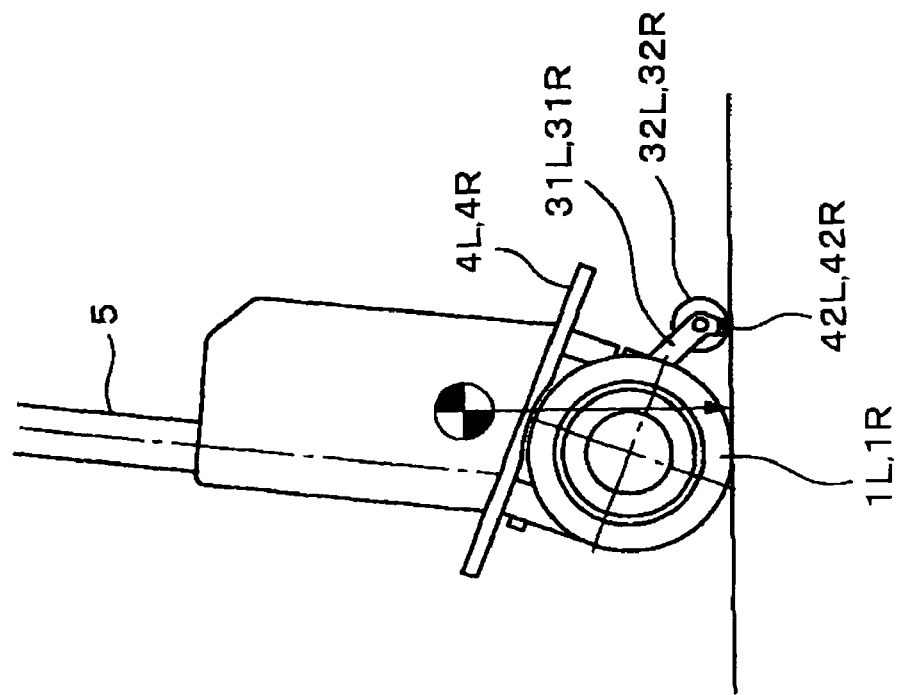
FIG. 10B is a side view showing the constitution and an operation of the fourth embodiment of the coaxial two-wheeled vehicle to which the traveling device according to the present invention is applied.

During conveyance, on the other hand, the casters 32L, 32R, and not the grounding portions 42L, 42R, contact the ground, as shown in FIG. 10B, and therefore effective conveyance is realized with a small amount of force. Hence, the fourth embodiment is also capable of realizing a traveling device that can support itself and be conveyed easily.

According to the traveling device of the present invention, in a traveling device comprising a plurality of wheels disposed in parallel, a vehicle main body provided between the plurality of wheels and installed with a mechanism for controlling driving of the plurality of wheels, and a handle that is mounted on the vehicle main body, casters that contact the ground when the vehicle main body is tilted to a predetermined angle are provided so that the handle and the vehicle main body can support themselves, and as a result, a traveling device that can support itself and be conveyed easily can be realized.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling device, comprising:
   a plurality of wheels disposed in parallel;
   a vehicle main body provided between the plurality of wheels and installed with a mechanism for driving the plurality of wheels;
   a handle that is mounted on the vehicle main body;
   a first support portion located on a lower rear side of the vehicle main body;
   a second support portion connected to the first support portion via a first rotary shaft;
   a caster connected to the second support portion via a second rotary shaft;
   an elastic member to elastically restrain the second support portion within a predetermined range; and
   a stop mechanism to limit movement of the second support portion toward the plurality of wheels,
   wherein a perpendicular is defined as a line extending from the first rotary shaft to a ground surface,
   wherein, when the vehicle main body is tilted to a horizontal position:
   (1) the second support portion is disposed in a predetermined position by the elastic member,
   (2) the caster is pulled away from the ground surface, and (3) the caster is disposed on the opposite side of the perpendicular as the plurality of wheels, wherein, when the vehicle main body is tilted to a predetermined angle such that the position of the second rotary shaft is located on the same side of the perpendicular as the plurality of wheels:
(1) the plurality of wheels and the caster are brought into contact with the ground surface, and
(2) the handle and vehicle main body support themselves, wherein, when the vehicle main body is tilted beyond the predetermined angle:
(1) the plurality of wheels are pulled away from the ground surface, and
(2) the caster is rotated without restraint so that the vehicle main body can be pulled by holding the handle, and wherein, when the caster comes into contact with the ground surface while the vehicle is traveling with a driver riding thereon, the second support portion is displaced from the predetermined position according to a reactive force exerted by the ground surface on the caster, such that the second rotary shaft is displaced away from the plurality of wheels.

2. The traveling device according to claim 1, further comprising:

a ground contact member located on the caster and comprising a second elastic member, wherein, when the vehicle main body is tilted to the predetermined angle, the plurality of wheels and the ground contact member are brought into contact with the ground, and the caster is thereby pulled away from the ground surface so that the handle and the vehicle main body support themselves, and wherein, when the vehicle main body is tilted beyond the predetermined angle, the ground contact member is pulled away from the ground surface, and the caster is thereby brought into contact with the ground surface.

* * * * *